United States Patent
Tsien et al.

(10) Patent No.: US 7,236,790 B2
(45) Date of Patent: Jun. 26, 2007

(54) DISTRIBUTED RADAR DETECTION FOR WLAN

(75) Inventors: Chin C. Tsien, San Diego, CA (US); Jiewen Liu, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 247 days.

(21) Appl. No.: 10/861,293

(22) Filed: Jun. 3, 2004

(65) Prior Publication Data

US 2005/0272435 A1 Dec. 8, 2005

(51) Int. Cl.
*H04Q 7/20* (2006.01)
(52) U.S. Cl. .............. 455/450; 455/423; 455/420; 342/159; 342/162
(58) Field of Classification Search .......... 455/450, 455/453, 423, 420; 370/329, 328; 342/159, 342/162
See application file for complete search history.

(56) References Cited

U.S. PATENT DOCUMENTS

| | | | | |
|---|---|---|---|---|
| 5,561,846 A | * | 10/1996 | Hagio | 370/337 |
| 6,266,531 B1 | * | 7/2001 | Zadeh et al. | 455/453 |
| 6,292,475 B1 | * | 9/2001 | Swail | 370/329 |
| 6,999,775 B1 | * | 2/2006 | Tikka | 455/453 |
| 2003/0134642 A1 | * | 7/2003 | Kostic et al. | 455/450 |
| 2004/0156336 A1 | * | 8/2004 | McFarland et al. | 370/329 |
| 2005/0208950 A1 | * | 9/2005 | Hasse | 455/453 |

FOREIGN PATENT DOCUMENTS

WO WO 03/050560 A1 6/2003

OTHER PUBLICATIONS

IEEE, "IEEE 802.11h: Amendment 5: Spectrum and Transmit Power Management Extensions in the 5 GHz band in Europe" IEEE STD 802.11H, Oct. 14, 2003, XP002292634.
PCT ISR and WO dated Sep. 29, 2005.

* cited by examiner

*Primary Examiner*—Danh Le
(74) *Attorney, Agent, or Firm*—John F. Travis

(57) ABSTRACT

A base station that monitors for radar signals may reassign the monitoring operation to one or more wireless mobile devices whenever channel load exceeds a first value. The one or more wireless mobile devices may then report to the base station when a radar signal is detected so that the base station may switch communications to a different channel that does not interfere with the radar. In some embodiments the monitoring function may be assigned back to the base station if the channel load decreases below a second value.

20 Claims, 4 Drawing Sheets

DISTRIBUTED RADAR DETECTION FOR WLAN

BACKGROUND

Wireless Local Area Network (WLAN) products may operate at various frequencies, such as 2.4 gigahertz (GHz) or 5 GHz. Those operating at 5 GHz must share the band with government/military radar systems, and may therefore interfere with those radar systems. Because reliable operation of the radar is considered a higher priority use than the consumer or commercial use of WLAN, WLAN systems may be required to monitor for radar signals. When a radar signal is detected that is above a certain strength, the WLAN system may be required to switch to a non-interfering frequency.

In conventional systems the base station, or access point (AP), may be responsible for monitoring for radar signals, and may further be required to redirect all communications to a new frequency within a defined time when a radar signal is detected. However, because the AP generally handles all communications within the WLAN, when the WLAN is in a heavy traffic condition the overworked AP may have to choose between monitoring for radar signals and keeping the flow of communications going. The choice that is made may affect whether network performance suffers, or the AP misses a radar signal and possibly interferes with the radar.

BRIEF DESCRIPTION OF THE DRAWINGS

The invention may be understood by referring to the following description and accompanying drawings that are used to illustrate embodiments of the invention. In the drawings.

DETAILED DESCRIPTION OF THE INVENTION

Figure 1:
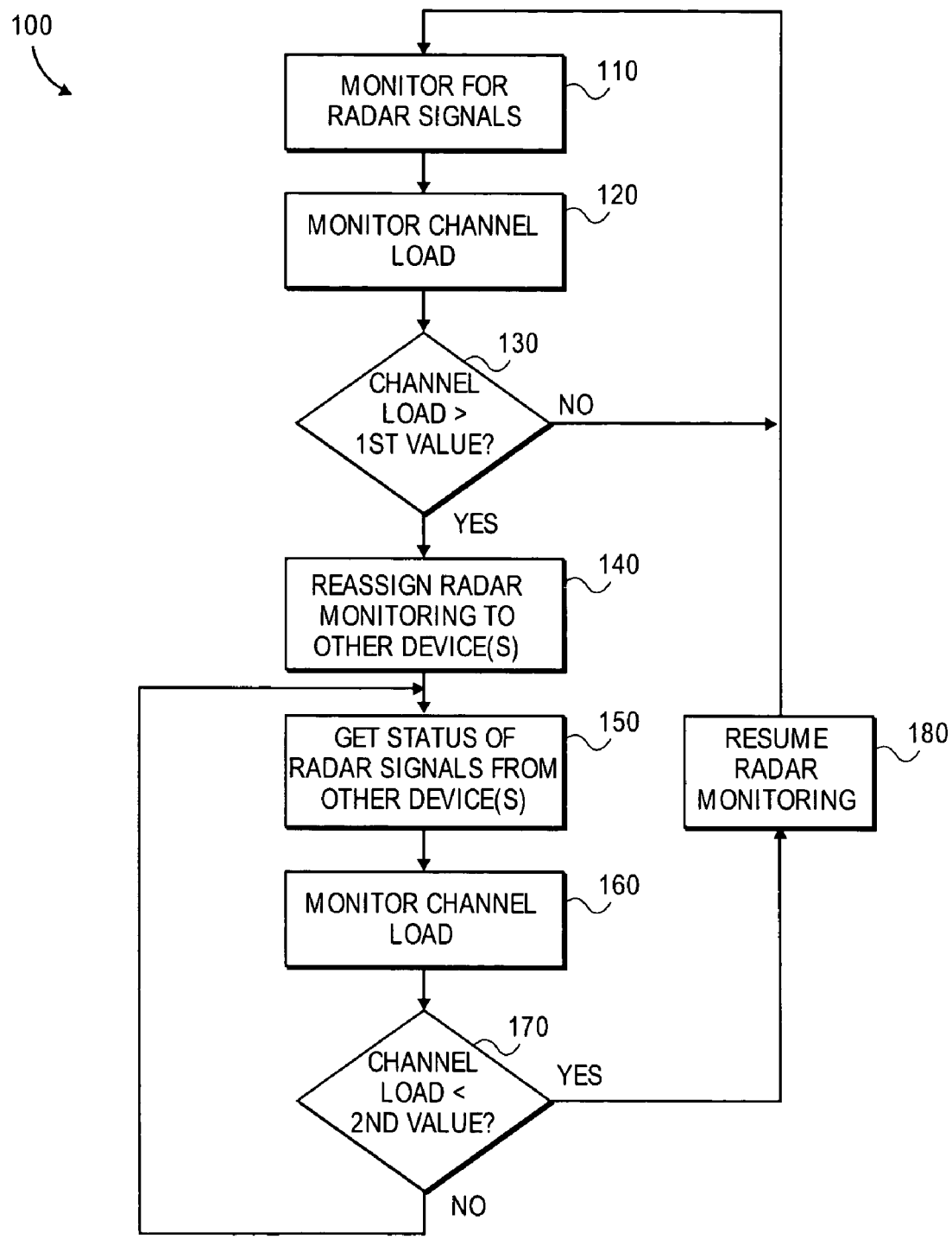
FIG. 1 shows a flow diagram of a method pertaining to responsibility for monitoring for radar signals, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Any reference to a frequency or frequency band may include slight variations in frequency due to such things as bandwidth tolerance, Doppler shift, parameter drift, etc.

Embodiments of the present invention may include apparatuses for performing the operations herein. An apparatus may be specially constructed for the desired purposes, or it may comprise a general purpose device selectively activated or reconfigured by a program stored in the device.

The invention may be implemented in one or a combination of hardware, firmware, and software. The invention may also be implemented as instructions stored on a machine-readable medium, which may be read and executed by a processing platform to perform the operations described herein. A machine-readable medium may include any mechanism for storing, transmitting, or receiving information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive those signals, etc.), and others.

In some embodiments of the invention, a base station may dynamically assign a radar monitoring operation to at least one other device whenever the channel load exceeds a defined value. The channel load may be the fractional amount of time that the channel is busy, as determined over a period of time. The at least one other device may be one or more wireless mobile devices that the base station has established communications with.

FIG. 1 shows a flow diagram of a method pertaining to responsibility for monitoring radar signals, according to an embodiment of the invention. In the illustrated flow diagram 100, the device performing the method may monitor for radar signals at 110. Such monitoring may comprise detecting radar signals that are above a defined signal strength at one or more defined frequencies Distinguishing between radar signals and other types of signals may be accomplished by any feasible method currently known or yet to be developed. At 120, channel load may be monitored to determine how busy the channel is over a defined period of time. Channel load may be monitored using any feasible method currently known or yet to be developed, such as but not limited to: 1) determining what fraction of time a carrier signal is detected, 2) estimating channel load based on the amount of data queued up in various transmit queues that will be using the channel, 3) etc. The radar signal monitoring at 110 and the channel load monitoring at 120 may be conducted at separate times, at the same time, at intermixed times, or with any other feasible timing relationship to each other.

At 130 an indicator of channel load, however it was determined, may be compared against a first value. If the channel load is greater than a certain amount, as determined by this comparison (greater channel load indicates a busier channel with less channel idle time for various devices to potentially access the channel), then the device performing the method of flow diagram 100 may reassign the task of monitoring for radar signals to one or more other devices at 140. In some embodiments the device performing the method of flow diagram 100 may be a base station and the other devices that are reassigned the radar monitoring task may be wireless mobile devices in communication with the base station, but various embodiments of the invention may not be limited in this respect. After reassigning responsibility for radar monitoring to other device(s), the device performing the method of flow diagram 100 may stop monitoring for radar signals, but various embodiments of the invention may not be limited in this respect.

In various embodiments, the devices that are reassigned to monitor for radar signals may include any of: 1) a single device, 2) all of the wireless mobile devices currently associated with the base station, 3) a subset of all the wireless mobile devices currently associated with the base station, and 4) other combinations not specifically listed here. In some operations, responsibility for monitoring radar signals might be assigned to devices that are unable to carry out the task. In some embodiments the base station may disassociate (e.g., stop data communications with) the devices that are unable to report back radar detection status, due to one or more of: 1) lack of radar detection capability, 1) lack of reporting capability, 3) any other reason. In some embodiments, some or all of the disassociated devices may be reassociated when the radar monitoring operation is resumed by the base station, or at other times for other reasons.

At 150, the device performing the method of flow chart 100 may receive status reports from those devices that are able to detect radar signals and report the fact of that detection. Such reports may include one or more indicators that a radar signal has been detected. Such reports may be made in various ways, such as but not limited to: 1) messages specifically dedicated to the radar reporting function, 2) embedded in messages used for other purposes, 3) non-message formats, 4) etc. In various embodiments where the received radar signal strength is used to determine whether a radar signal is significant, the wireless mobile device may report only those radar signals that exceed a given strength, or may report all detections along with an indicator of the received signal strength of the associated radar signals.

While the radar detection operation is being carried out by other devices, the base station may continue to monitor channel load at 160. If an indicator of channel load drops below a second value, as determined at 170, the base station may resume radar monitoring at 180 and instruct the other devices to cease radar monitoring. In some embodiments, the value at 170 will be sufficiently less than the value at 130 so as to reduce or eliminate "thrashing", i.e., rapid recycling of the radar monitoring operation between the base station and the wireless mobile devices. In some embodiments, thrashing may be reduced by observing a minimum time that must elapse before radar monitoring is reassigned. In some embodiments, either or both of the first and second comparison values may be changed by the base station in response to various criteria.

Figure 2:
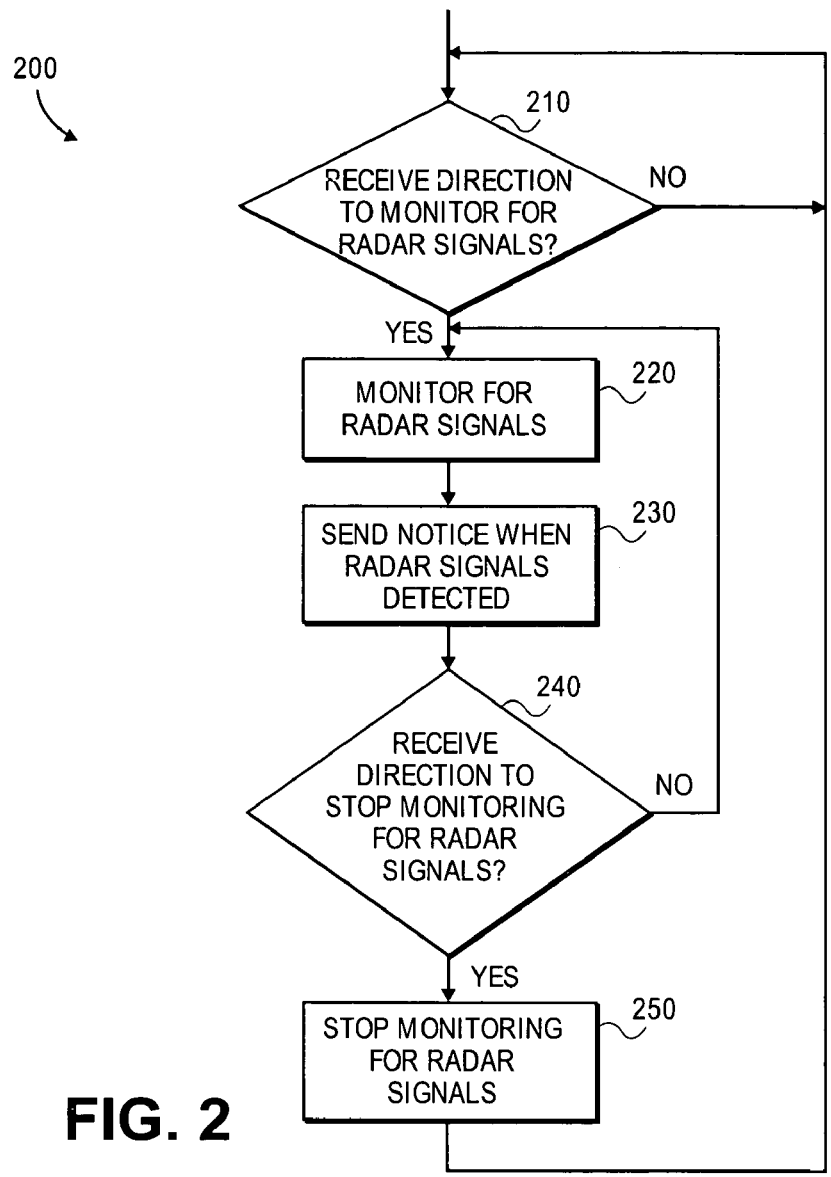
FIG. 2 shows a flow diagram of another method pertaining to responsibility for monitoring for radar signals, according to an embodiment of the invention.

FIG. 2 shows a flow diagram of another method pertaining to responsibility for monitoring for radar signals, according to an embodiment of the invention. This method may be performed by a wireless mobile device, although some embodiments of the invention may not be limited in this respect. In flow diagram 200, at 210 the device may receive direction to monitor for radar signals. Such direction may come from a base station in the form of a command message to begin performing this operation, though some embodiments of the invention may not be limited in this respect. Upon receiving such direction, the device may monitor for radar signals at 220.

When a radar signal is detected, that information may be reported back to the base station at 230. In some embodiments, only specific types of radar signals may be reported, while in other embodiments all types of radar signals may be reported. In various embodiments reporting may be handled in various ways, such as but not limited to: 1) the status of radar detection may be reported when requested by the base station, 2) the status of radar detection may be reported on a scheduled basis, 3) the status of radar detection may be reported only in response to detection of a relevant radar signal, 4) reporting may be based on other factors not discussed, 5) a combination of one or more of these techniques.

At some point the device may receive direction to stop monitoring for radar signals. If such direction is received, as indicated at 240, monitoring may stop at 250. In the absence of such direction, monitoring may continue through the loop at 220-230-240. Of course, other factors may also cause the device to stop monitoring for radar signals. Such factors may include, but are not limited to, such things as a reset, loss of power, low battery indication, loss of association with the base station, etc.

Some devices may not have the ability to monitor for radar signals, and/or may not have the ability to report detection of radar signals. For such devices, flow chart 200 may not be applicable.

Figure 3:
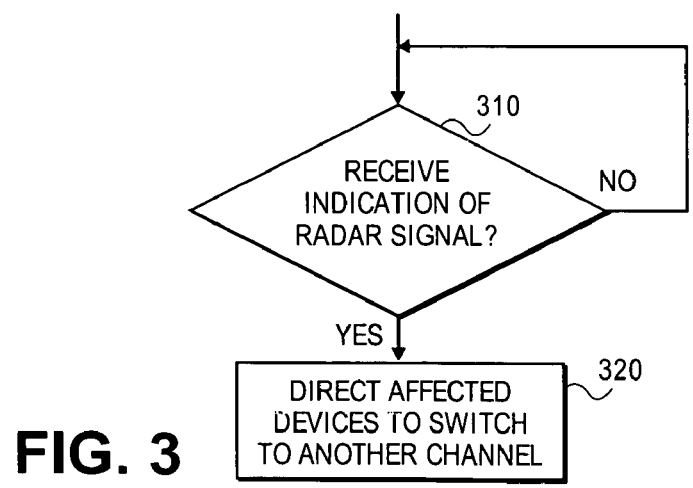
FIG. 3 shows a flow diagram of action to take in the event a radar signal is detected, according to an embodiment of the invention.

FIG. 3 shows a flow diagram of action to take in the event a radar signal is detected, according to an embodiment of the invention. In flow diagram 300, at 310 an indication is received that a relevant radar signal has been detected. In some embodiments a radar signal may be considered relevant based on various criteria, which may include but are not limited to: 1) received signal strength is greater than some value, 2) the radar has certain identifiable characteristics, such as frequency, format, source identification, etc., 3) other factors not listed. In response to receipt of an indication that a relevant radar signal has been detected, at 320 the devices on the channel may switch to another channel that is estimated not to interfere with signals from the detected radar. In some embodiments the radar signal may be detected by the base station, which generates its own indication that a radar signal has been detected. In other embodiments, the radar signal may be detected by one or more wireless mobile devices, which send indicators to the base station informing the base station that a radar signal has been detected. In the event that some wireless mobile devices report detection of a radar signal while other wireless mobile devices do not, the base station may use an algorithm (not described herein) to determine whether or not to change to a different channel.

In some embodiments the base station may send a message to the associated wireless mobile devices to change to another channel, and identify which channel, though various embodiments of the invention are not limited in this respect. In some embodiments, changing to a different channel comprises changing to a different frequency, regardless of the communications technology being used.

Figure 4:
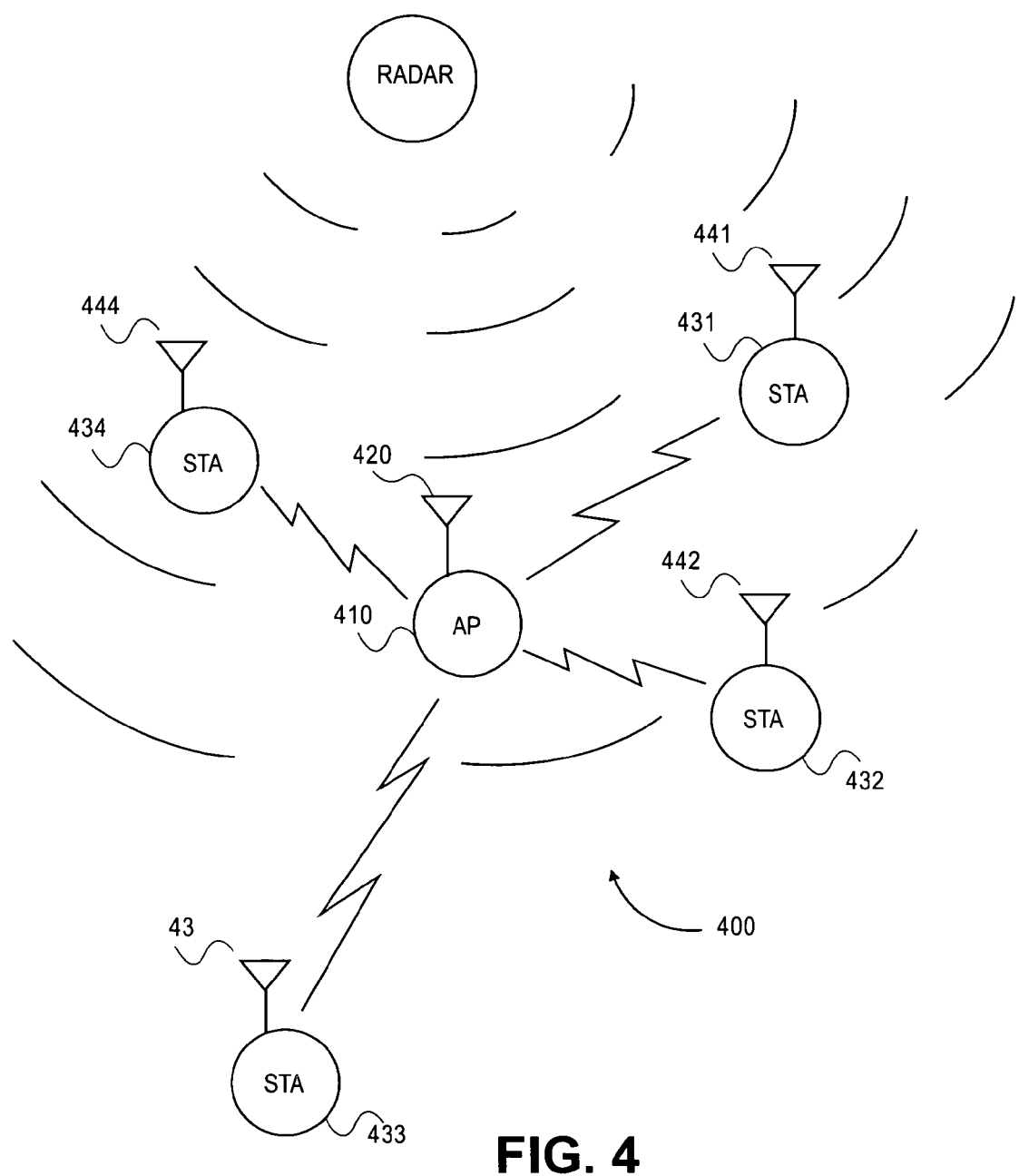
FIG. 4 shows a diagram of a wireless network in which the operations of FIGS. 1, 2, and 3 may occur, according to an embodiment of the invention.

FIG. 4 shows a diagram of a wireless network in which the operations of FIGS. 1, 2, and 3 may occur, according to an embodiment of the invention. In the illustrated network 400, an AP 410 may communicate with multiple wireless mobile devices (STAs) 431, 432, 433 and 434. Each device is shown with an antenna (420 for the AP and 441–444 for the STAs) through which the device may transmit and receive signals according to the protocols of the communications technology being used. The AP may communicate with each of the STAs, while each STA may communicate with the AP. In some embodiments at least one STA may monitor or otherwise communication directly with another STA, although the invention is not limited in this respect. Although only one antenna is shown per device, some or all of the devices may have more than one antenna. Each antenna may be of various types, such as but not limited to a dipole antenna and/or an omni-directional antenna.

FIG. 4 also shows a radar 460 operating close enough to the network 400 for its signals to be detected by at least some of the devices in network 400. The radar signals propagating from radar 460 are indicated by curved lines. In some embodiments, the antenna used to detect radar signals may be different that the antenna used to communicate with other devices in the network. In some instances, some of the devices in the network may be located close enough to the radar 460 to detect radar signals (e.g., devices 410, 431, 434), while other devices may be located too far from the radar to detect the radar signals (e.g., devices 432, 433). This situation may lead to the need for an algorithm such as the one mentioned at the end of paragraph [0024].

Figure 5:
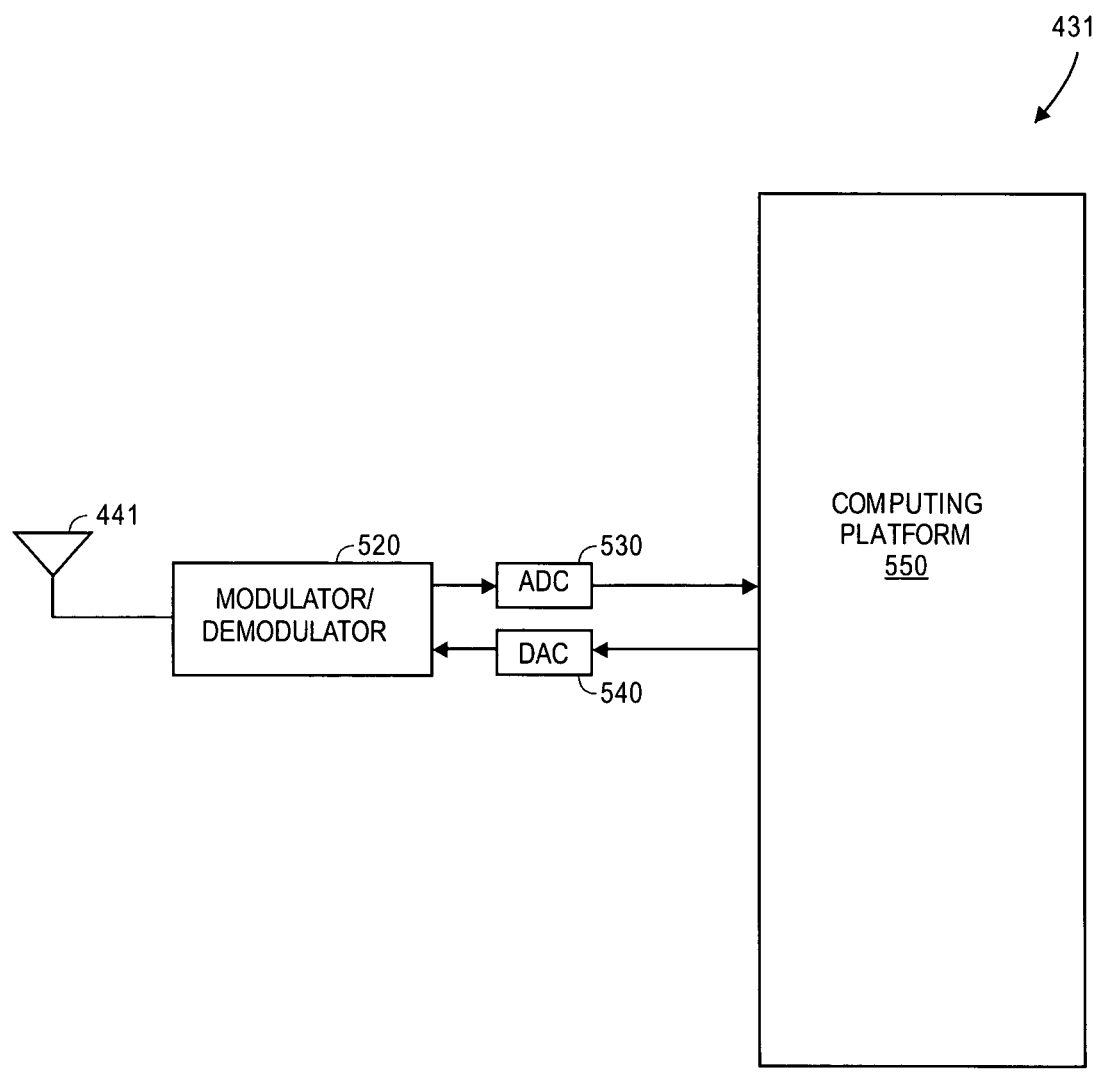
FIG. 5 shows a wireless device, according to an embodiment of the invention.

FIG. 5 shows a wireless device, according to an embodiment of the invention. Although the wireless device and its antenna are labeled 431 and 441, corresponding with an exemplary STA in FIG. 4, the drawing may also illustrate the components of an AP. In the illustrated embodiment of FIG. 5, computing platform 550 may be coupled to antenna 441 through modulator/demodulator 520, analog to digital converter (ADC) 530, and digital to analog converter (DAC) 540. The ADC and DAC may convert signals between analog and digital formats, while the modulator/demodulator may convert between the analog signals and a high frequency signal suitable for wireless communications. Other components not shown may also be included.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising
   a computing platform and a modulator/demodulator coupled to each other, the computing platform and the modulator/demodulator to:
      communicate with at least one wireless mobile device on a wireless channel;
      perform a radar monitoring operation on the channel;
      monitor channel load on the channel;
      reassign the radar monitoring operation to the at least one wireless mobile device resultant to the channel load exceeding a first value and stop performing the radar monitoring operation; and
      receive a status of the radar monitoring operation from the at least one wireless mobile device;
      wherein said performing the radar monitoring operation and said monitoring channel load are intermixed in time.

2. The apparatus of claim 1, wherein the computing platform and the modulator/demodulator are further to switch to a different channel resultant to the status indicating a radar is to operate on a same frequency as the channel.

3. The apparatus of claim 1, wherein the computing platform and the modulator/demodulator are to disassociate any of the at least one wireless mobile devices that is unable to report the status.

4. The apparatus of claim 3, wherein the computing platform and the modulator/demodulator are to reassociate at least one of the disassociated wireless mobile devices.

5. The apparatus of claim 1, wherein the computing platform and the modulator/demodulator are to reassign the radar monitoring operation to the base station, resultant to the channel load being below a second value less than the first value.

6. The apparatus of claim 1, wherein the computing platform and the modulator/demodulator are further to change the first value.

7. A method, comprising:
   communicating with at least one other device over a first wireless channel;
   monitoring channel load on the first wireless channel;
   monitoring for detection of a radar signal on the first wireless channel;
   comparing the channel load with a first value; and reassigning said monitoring for detection of the radar signal to the at least one other device, resultant to said channel load being greater than the first value;

wherein said monitoring channel load and said monitoring for detection of the radar signal are intermixed in time.

8. The method of claim 7, wherein said monitoring channel load is performed by a base station.

9. The method of claim 8, further comprising:

receiving an indicator of detecting the radar signal from at least one of the multiple other devices; and switching communications between the base station and said at least one other device to a second wireless channel.

10. The method of claim 7, further comprising:

monitoring the channel load subsequent to said reassigning; and assigning said monitoring for detection of the radar signal back to the base station resultant to the channel load being below a second value less than the first value.

11. A system, comprising a base station coupled to an omnidirectional antenna, the base station to:

communicate with multiple wireless mobile devices over a first wireless channel;

monitor channel load on the first wireless channel;

monitor for radar signals on the first wireless channel;

reassign the radar monitoring operation from the base station to at least one of the multiple wireless mobile devices resultant to the channel load exceeding a first value; and receive a status of the radar monitoring operation from the at least one of the multiple wireless mobile devices;

wherein said monitoring channel load and said monitoring for radar signals are intermixed in time.

12. The system of claim 11, wherein the base station is further to switch to a second wireless channel resultant to the status indicating a radar is to operate on a same frequency as the channel.

13. The system of claim 11, wherein the base station is to disassociate any of the at least one wireless mobile devices that is unable to report the status.

14. The system of claim 13, wherein the base station is to reassociate at least one of the disassociated wireless mobile devices.

15. The system of claim 11, wherein the base station is to reassign the radar monitoring operation to the base station, resultant to the channel load being below a second value less than the first value.

16. The system of claim 11, wherein the base station is to perform the radar monitoring operation prior to said assigning.

17. An article comprising a computer-readable medium that provides instructions, which when executed by a processing platform, cause said processing platform to perform operations comprising:

communicating with at least one other device over a first wireless channel;

monitoring channel load on the first wireless channel;

monitoring for detection of a radar signal on the first wireless channel;

comparing the channel load with a first value; and reassigning said monitoring for detection of the radar signal to the at least one other device, resultant to said channel load being greater than the first value;

wherein said monitoring channel load and said monitoring for detection of the radar signal are intermixed in time.

18. The article of claim 17, wherein said monitoring channel load is performed on a base station.

19. The article of claim 18, further comprising:

receiving an indicator of detecting the radar signal from the at least one other device; and switching communications between the base station and the at least one other device to a second wireless channel resultant to said receiving the indicator.

20. The article of claim 17, further comprising:

continuing said monitoring the channel load subsequent to said reassigning; and assigning said monitoring for detection of the radar signal back to the base station resultant to the channel load being below a second value less than the first value.

* * * * *